United States Patent
Guillemin et al.

(10) Patent No.: US 6,332,759 B1
(45) Date of Patent: Dec. 25, 2001

(54) HEATING AND/OR AIR-CONDITIONING INSTALLATION COMPRISING A MOTOR-DRIVEN FAN UNIT

(75) Inventors: Jean Guillemin, St Agnan S/Erre; Bernard Boucheret, Gennevilliers; Gilbert Terranova, Chartres; Christophe Aloup, Paris, all of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/671,612

(22) Filed: Sep. 28, 2000

(30) Foreign Application Priority Data

Sep. 29, 1999 (FR) .................................................. 99 12127

(51) Int. Cl.$^7$ ................................................... F04B 17/00
(52) U.S. Cl. ............................................................. 417/366
(58) Field of Search .................................... 417/366, 326, 417/295, 423.14, 422

(56) References Cited

U.S. PATENT DOCUMENTS

| | | | |
|---|---|---|---|
| 5,070,267 | * 12/1991 | Sano et al. ............................... | 310/89 |
| 5,814,908 | * 9/1998 | Muszynski ............................... | 310/62 |
| 5,842,840 | * 12/1998 | Korek et al. ............................. | 417/423.14 |
| 5,878,990 | * 3/1999 | Delire ..................................... | 248/604 |
| 6,135,718 | * 10/2000 | Yang ....................................... | 417/22 |
| 6,203,420 | * 3/2001 | Loupo et al. ........................... | 454/139 |
| 6,280,316 | * 8/2001 | Loup ...................................... | 454/158 |
| 6,283,726 | * 9/2001 | Fackelmann et al. ................... | 417/366 |

FOREIGN PATENT DOCUMENTS

| | | |
|---|---|---|
| 4302449 | 8/1994 | (DE) . |
| 19824342 | 2/1999 | (DE) . |
| 2676610 | 11/1992 | (FR) . |
| 2742813 | 6/1997 | (FR) . |

* cited by examiner

*Primary Examiner*—Teresa Walberg
*Assistant Examiner*—Vinud D. Patel
(74) *Attorney, Agent, or Firm*—Liniak, Beranato, Longacre & White

(57) ABSTRACT

A heating and/or air-conditioning installation with a motor-driven fan unit has a motor driving a turbine, a speed control module and a volute housing the motor and forming an outlet channel for airflow at the periphery of the turbine. The speed control module is mounted at the periphery of the motor and has an electrical connector engaging a connector of the motor. It also has one or more walls of thermally conducting material and in contact with the outlet channel to cool the module.

13 Claims, 4 Drawing Sheets

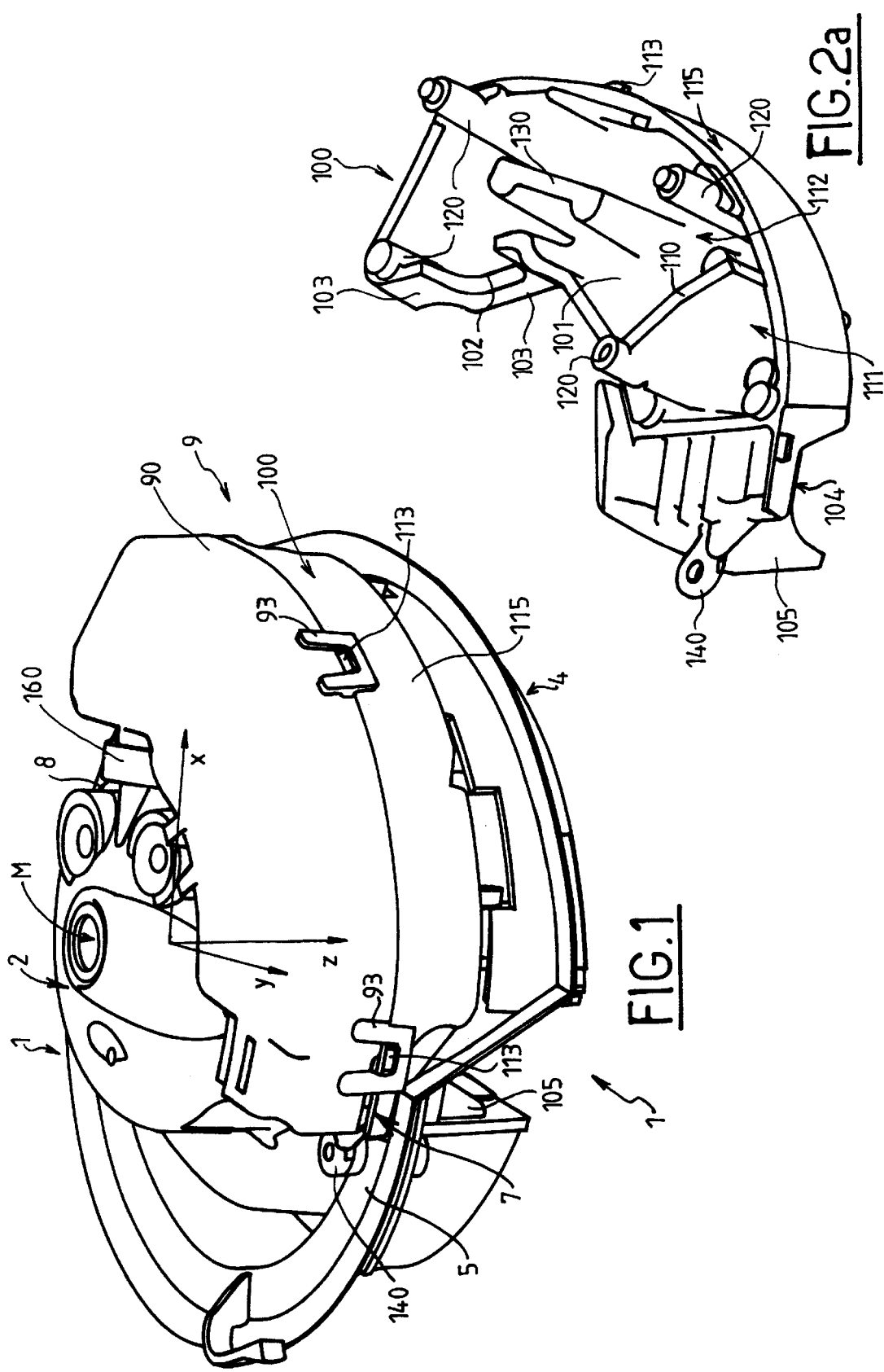

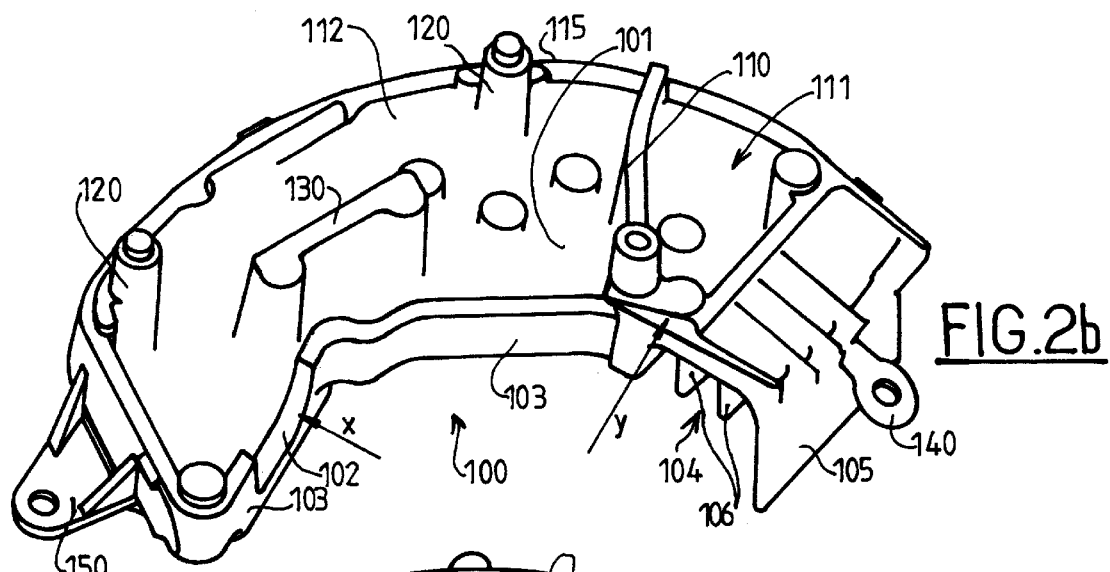
FIG.2b
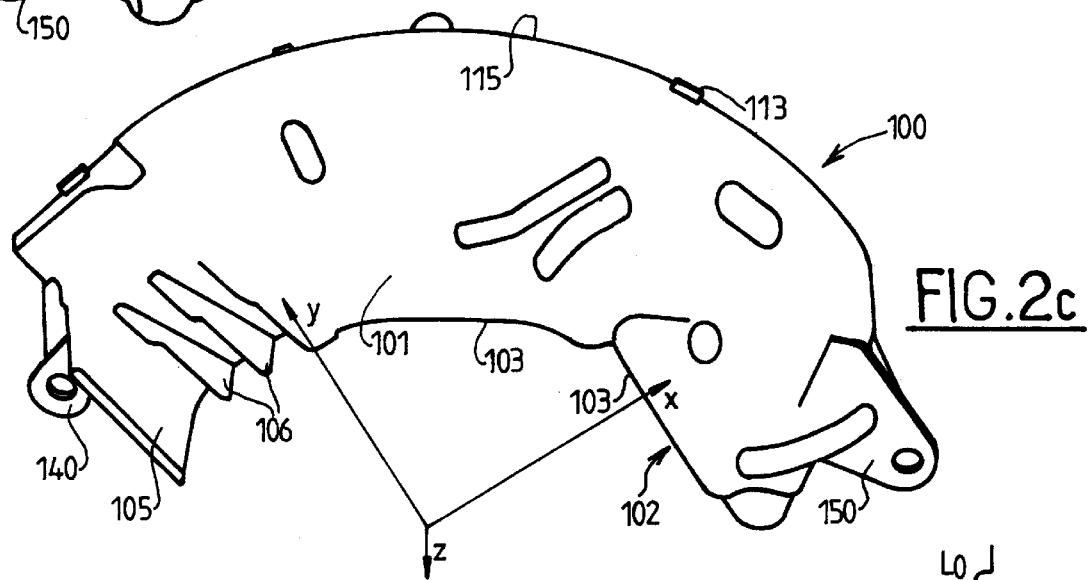
FIG.2c
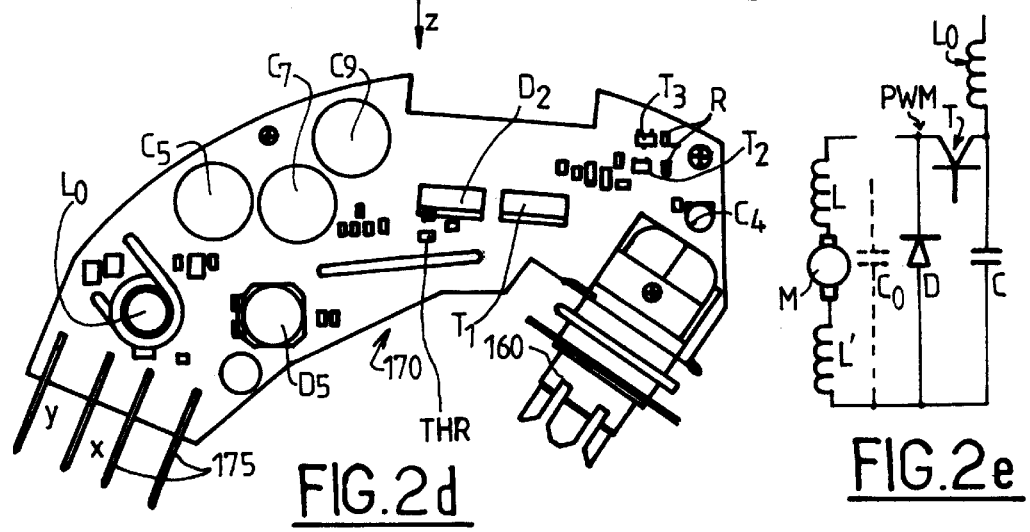
FIG.2d
FIG.2e

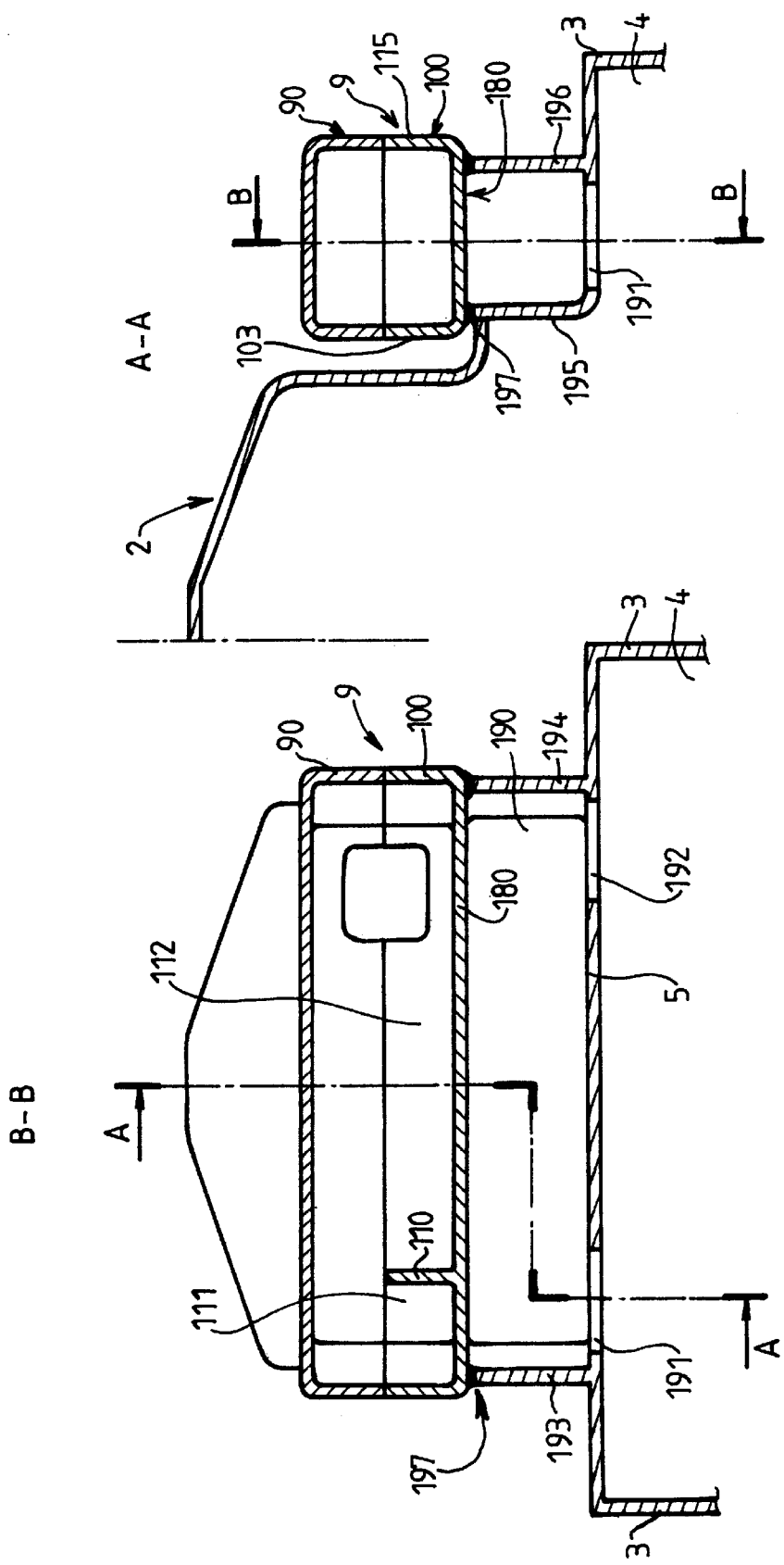

HEATING AND/OR AIR-CONDITIONING INSTALLATION COMPRISING A MOTOR-DRIVEN FAN UNIT

FIELD OF THE INVENTION

The subject of the present invention is a heating and/or air-conditioning installation comprising a motor-driven fan unit including a motor, a module for varying the speed of the motor, a turbine driven by the motor, and a volute within which the motor is housed and defining an outlet channel for an airflow at the periphery of the turbine.

BACKGROUND OF THE INVENTION

In such an installation, the module for varying the speed of the motor must meet a certain number of constraints, particularly as regards the removal of the heat energy generated by the module, as well as relating to electromagnetic interference. For example, the use of a module of the pulse-width modulation type employs power-pulse switching operations which generate electromagnetic radiation, which is transported particularly by the connecting wires, downstream to the motor and upstream to the control electronics of the module and the power supply wires. The EMI electromagnetic interference standards limit the allowed radiation, which means that the modules, and particularly the modules with pulse-width modulation PWM, comprise filters, as does the motor.

It is certainly possible, as the U.S. Pat. No. 5,070,267 moreover teaches, to house the control module entirely within the motor, but this means designing the motor specifically, and there can the before be no question in such a case of using already existing standard motors. Moreover, implementing such integration poses not inconsiderable problems of cost.

It has been proposed, in addition, to house the module outside the motor, but this is accompanied by the existence of linking wires between the module and the motor which do not ease the solving of the problem of the electromagnetic interference EMI.

This EMI interference is generated by radiation from the linking wires which constitute antennae and/or from the power-supply cabling of the module, which can disturb electronic apparatus (car radio, etc.).

The object of the present invention is to provide a heating and/or air-conditioning installation which makes it possible at least partly to solve the abovementioned problems.

SUMMARY OF THE INVENTION

According to the present invention there is provided a heating and/or air-conditioning installation comprising a motor-driven fan unit including a motor, a module for varying the speed of the motor, a turbine driven by the motor, and a volute within which the motor is housed and defining an outlet channel for an airflow at the periphery of the turbine, wherein the speed-variation module is mounted at the periphery of the motor and features an electrical connector plugged into a complementary connector of the motor, as well as at least one wall made of a thermally conducting material which is in communication with the outlet channel of the volute so as to cool the module.

This assembly, by virtue of a direct connection between the module and the motor, makes it possible to avoid electromagnetic interference being generated by wires for linking between the module and the motor, and, moreover, the mounting position makes it possible easily to put at least one cooling wall in contact with the air originating from the turbine or blower.

In particular, at least one said wall can be arranged in an aperture opening out into the outlet channel of the volute.

The cooling can be enhanced by arranging several of these said walls in such a way as to form cooling fins.

It is advantageous for least one said wall to run along a wall of the said aperture formed in the volute and opening out into the outlet channel, this making it possible, in particular, to facilitate mounting by forming a reference surface which forms an end stop when the connector is at the end of connection travel.

Preferably, the said aperture forms part of a channel for cooling the motor, which takes in air from the airflow from the outlet channel of the volute.

The module may feature a face which comes to bear on one face of the volute which forms one side of the outlet channel.

The module may advantageously be of circular-sector shape, so as to match closely to the outer contour of the volute.

The components of the module are advantageously arranged in a casing featuring at least one part made of metal or loaded plastic.

It is advantageous for the casing to feature at least two compartments separated by at least one partition allowing thermal separation and/or isolation with regard to electromagnetic disturbances. In particular, a compartment may include at least one input choke of the module.

In one advantageous embodiment, an airflow channel is formed within the module, with an inlet which communicates with a first region of the outlet channel of the volute, and an outlet which communicates with a second region of the outlet channel of the volute, situated upstream of the first region with respect to the direction of flow of the airflow in the outlet channel.

In another advantageous embodiment, an airflow channel runs along the lower face of the module and communicates with the said outlet channel via a plurality of apertures, so as to pick up, from the outlet channel, an airflow which runs along the said lower face in order to cool the module.

BRIEF DESCRIPTION OF THE DRAWINGS

Preferred embodiments of the invention will now be described, by way of example, with reference to the accompanying drawings, in which:

FIG. 1 represents a module mounted on a volute, for which only the so-called lower half-volute is represented;

FIGS. 2a, 2b and 2c represent a casing element of the module carrying the fins and which comes into contact with the volute.

FIG. 2d is a diagram representing the printed circuit mounted in the module;

FIG. 2e is a simplified diagram illustrating the protective filtering of the module and of the motor;

and FIGS. 4a and 4b represent the section BB and AA of a variant embodiment of the invention.

DESCRIPTION OF THE PREFERRED EMBODIMENTS

Figure 3:
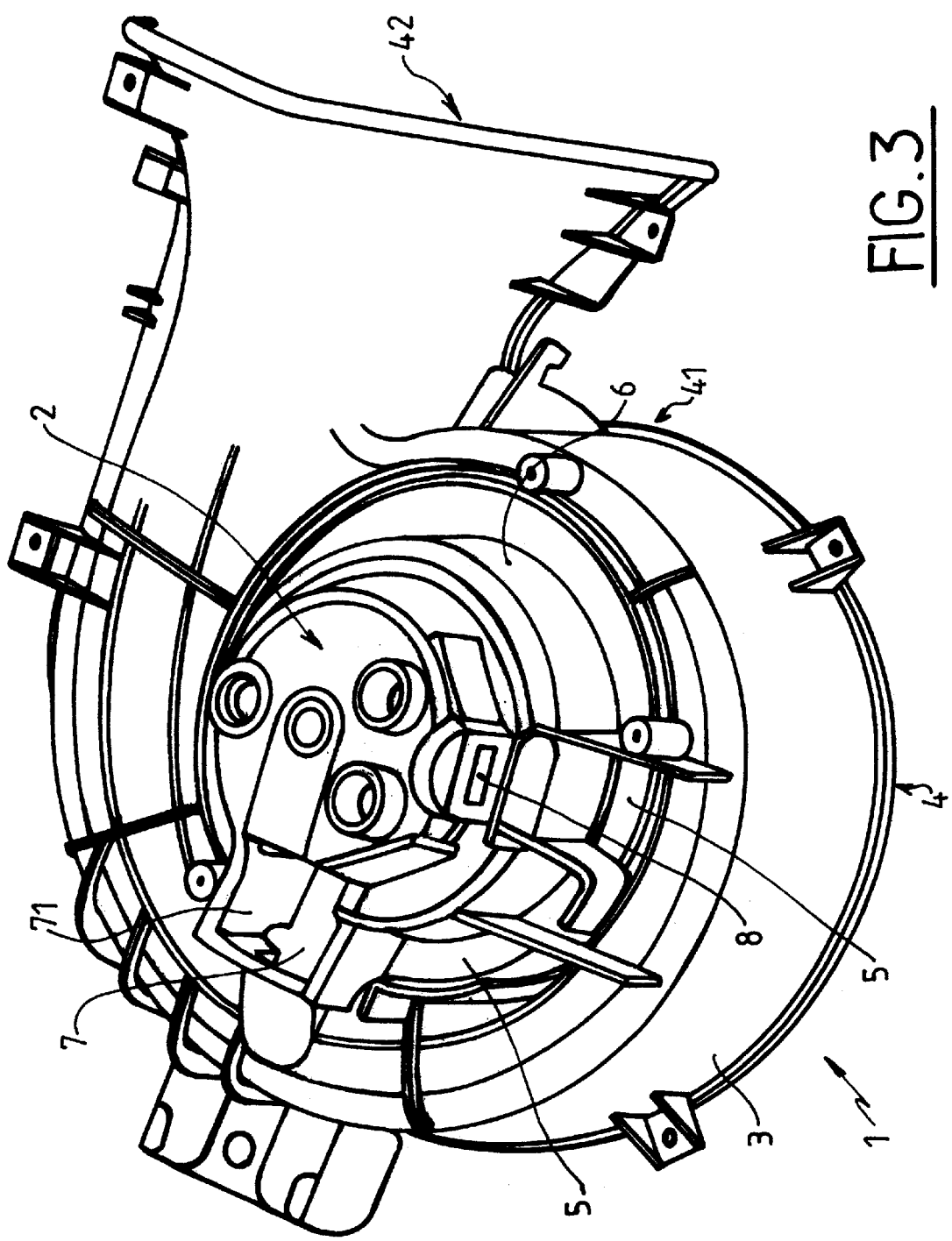
FIG. 3 represents a volute element, namely a lower half-volute, on which the module is intended to be mounted.

In the various figures, like reference numerals refer to like parts.

Turning more particularly to FIGS. 1 and 3, the mounting of the module 9 onto the volute 1 is carried out in such a way as to plug a connector 160 of the module 9 through an aperture 8 of a volute element 2 (for example half-volute or motor support 2) into a corresponding connector of the motor M, and, in this mounted position, at least one wall 105

(FIGS. 2a, 2c in particular) of a lower casing element 100 comes to be lodged in an aperture 7 of the volute element 2, this aperture 7 opening out into an outlet channel 4 of the volute which extends around a turbine or blower from a start region 41 and flaring out progressively towards an outlet 42. In particular, this aperture 7 can equally be used to cool the motor downstream of the cooling of the module.

The air supply to this aperture 7 is produced naturally under the effect of the dynamic pressure of the air which flows in the outlet channel 4. It will be noted, as is apparent in FIGS. 1 and 3, that the module 9 consists of an upper casing 90 and of a lower casing 100 linked by fixings 93, 113, and which are arranged in such a way as to come to bear on one face 5 of the volute which forms a platform which borders the outlet channel 4 surrounding the motor M. More particularly, the module 9 is housed in the vicinity of the start 41 of the outlet channel 4 and virtually in the first half of the angular space occupied by this channel. This arrangement is favourable to the extent that, on the one hand, there is no additional axial space required by the installation of the module 9 and, on the other hand, because this space situated around the motor M in the vicinity of the start 41 of the channel 4 is generally unused and can therefore be occupied without inconvenience.

As FIGS. 2a to 2c more particularly show, the lower part 100 of the casing 9 of the module features a bottom 101 which comes to bear on the platform-forming face 5 of the element 2 of the volute 1, a concave inner face 103 at one end of which is situated a housing 102 for the connector, and at the other end of which is arranged the cooling element 104 featuring at least one cooling wall 105, and additional fins 106 as the case may be. In the example represented, this wall 105 is situated at the end of the module 9 and runs along the face 71 of the aperture 7 in mounting position of the module when the connector 160 has been clipped fully into the complementary connector of the motor M.

The half-casing 100 also features spacers 120 allowing for the mounting of a printed circuit 170 represented diagrammatically in FIG. 2d. This circuit 170 features electrical power-supply contacts 175, and various electrical components: self-inductive components, for example an input choke $L_0$, capacitive components (C5, C7, C9, etc.), as well as transistors (T1, T2, T3) and/or a thyristor THR. So as to avoid over-rapid thermal propagation from one element to the other, the casing advantageously includes at least two compartments 111 and 112 separated by one (or more) partitions 110, which particularly makes it possible, as represented, to isolate the input choke $L_0$ arranged for this purpose in the compartment 111 which is juxtaposed with the exchanger 104 and which is separated by the partition 110 from the compartment 112 which carries the other components of the circuit. Moreover, the use of a metal partition 110 makes it possible to provide a certain electromagnetic immunity with regard to electromagnetic interference phenomena between the two compartments.

When the module 9 is mounted on the volute 1, the lower face 180 of the half-casing 100 is in contact with the platform-forming wall 5, the connector 160 is clipped into the corresponding connector of the motor and the wall or walls 105 and/or 106 are positioned in the aperture 7 so as to be traversed by the airflow of the channel 4. End lugs 140, 150 make it possible to fix the casing 100 in place once it has been put in place.

The geometry adopted, of a circular-sectorshaped casing, allows simple mounting in 3 stages, namely, a phase of approach substantially parallel to the X axis so as to position the wall 105 above the aperture 7 and the connector 160 close to the complementary connector, a position of descent in the direction of the OZ axis in order to lower the wall 105 into the housing 7 and arrange the connector 160 in position alongside the complementary connector, and finally a phase of connection parallel to the X axis in order to plug the connector 160 into the complementary connector and arrange the wall 105 close to the wall 71 or in abutment on it.

In order to avoid vibration being transmitted to the card, the connector 160 of the module is advantageously decoupled from the card, for example by an intermediate gasket made of flexible elastomer.

Leaktightness can easily be achieved by having the apertures of the module co-operate with the apertures of the support via conventional sealing means such as lips, elastomer gaskets, etc.

The use of a direct connection between the module and the motor makes it possible, in the case of a module of the PWM type for which the power to be removed is of the order of 20 W (see FIG. 2e) to dispense with a capacitor $C_0$ at the motor M, connected in parallel between the ends of the chokes L & L', and, at the module, with a series choke L1. These two elements thus omitted are represented in dashed line in FIG. 2e.

The cooling could be enhanced as required by making the air flow through the module itself in such a way that it directly bathes the components of the printed circuit. To that end, the module could be equipped with an air channel taking in air from the airflow in the aperture 7 and exhausting it into the channel 4 upstream in the direction of flow of the airflow. This counter-current flow is possible in fact, since the dynamic pressure increases in proportion with the distance from the inlet 41 of the channel 4 to its outlet 42.

According to the variant represented in FIGS. 4a and 4b, the module 9 is raised by walls 193, 194, 195, 196 provided at their upper part with sealing means 197 so as to free a channel 190 which communicates with the outlet channel 4 through apertures 191 and 192 formed, for example, in the wall 5 of the volute (for example half-volute or motor support 2), and which allow an airflow to pass which runs along the lower wall 180 of the module 9, possibly equipped with fins, not represented, so as to provide cooling of the module. The channel 190 thus takes in the air from the airflow of the channel 4 through at least one aperture and exhausts it into the channel 4 through at least one aperture.

What is claimed is:

1. A heating and/or air-conditioning installation comprising a motor-driven fan unit including a motor, a module for varying the speed of the motor, a turbine driven by the motor, and a volute within which the motor is housed and defining an outlet channel for an airflow at the periphery of the turbine, wherein the speed-variation module is mounted at the periphery of the motor and features an electrical connector plugged into a complementary connector of the motor, as well as at least one wall made of a thermally conducting material which is in communication with the outlet channel of the volute so as to cool the module.

2. The installation of claim 1, wherein at least one said wall is disposed in an aperture opening out into the outlet channel of the volute.

3. The installation of claim 2, wherein at least one said wall runs along a wall of the said aperture formed in the volute and opening out into the outlet channel.

4. The installation of claim 2, wherein the said aperture forms part of a channel for cooling the motor.

5. The installation of claim 1, comprising several said walls, forming cooling fins.

6. The installation of claim 1, wherein the module features a face which comes to bear on one face of the volute which forms one side of the outlet channel.

7. The installation of claim 1, wherein the module is of circular-sector shape.

8. The installation of claim 1, wherein the components of the module are arranged in a casing featuring at least one part made of metal or loaded plastic.

9. The installation of claim 8, wherein the casing features at least two compartments separated by at least one partition allowing thermal separation and/or isolation with regard to electromagnetic disturbances.

10. The installation of claim 9, wherein a compartment includes at least one input choke of the module.

11. The installation of claim 1, comprising an airflow channel within the module, having an inlet which communicates with a first region of the outlet channel of the volute, and an outlet which communicates with a second region of the outlet channel of the volute, situated upstream of the first region with respect to the direction of flow of the airflow in the outlet channel.

12. The installation of claim 1, comprising an airflow channel which runs along a lower face of the module and which communicates with the outlet channel via a plurality of apertures, so as to pick up from the outlet channel an airflow which runs along the said lower face of the module in order to cool it.

13. The installation of claim 1, wherein the module is of the pulse-width modulation type.

* * * * *